G. GODDU.
MACHINE FOR INSERTING FASTENINGS.
APPLICATION FILED FEB. 8, 1909.
1,030,775.
Patented June 25, 1912.
8 SHEETS—SHEET 4.
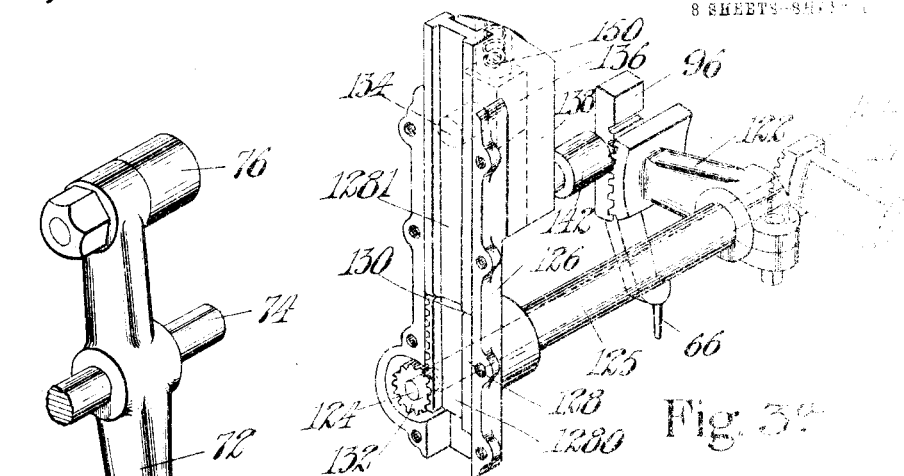
Fig. 3.
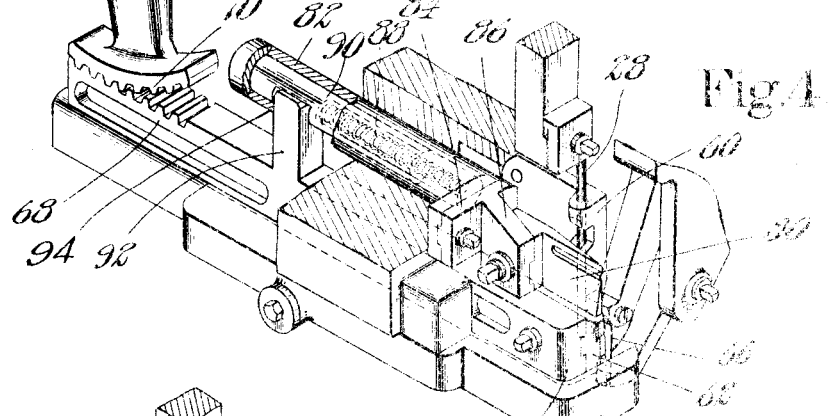
Fig. 4.
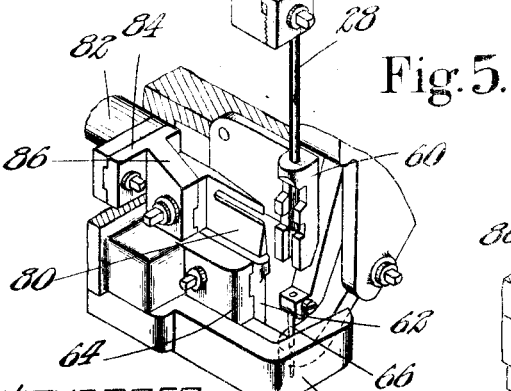
Fig. 5.
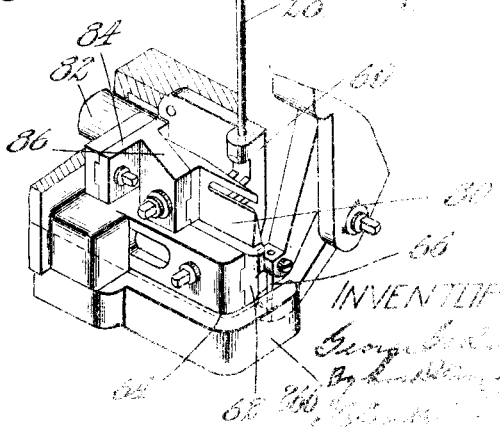
WITNESSES.
Elizabeth C. Coupe
Edith C. Holbrook
INVENTOR.
George Goddu
By his Attorneys

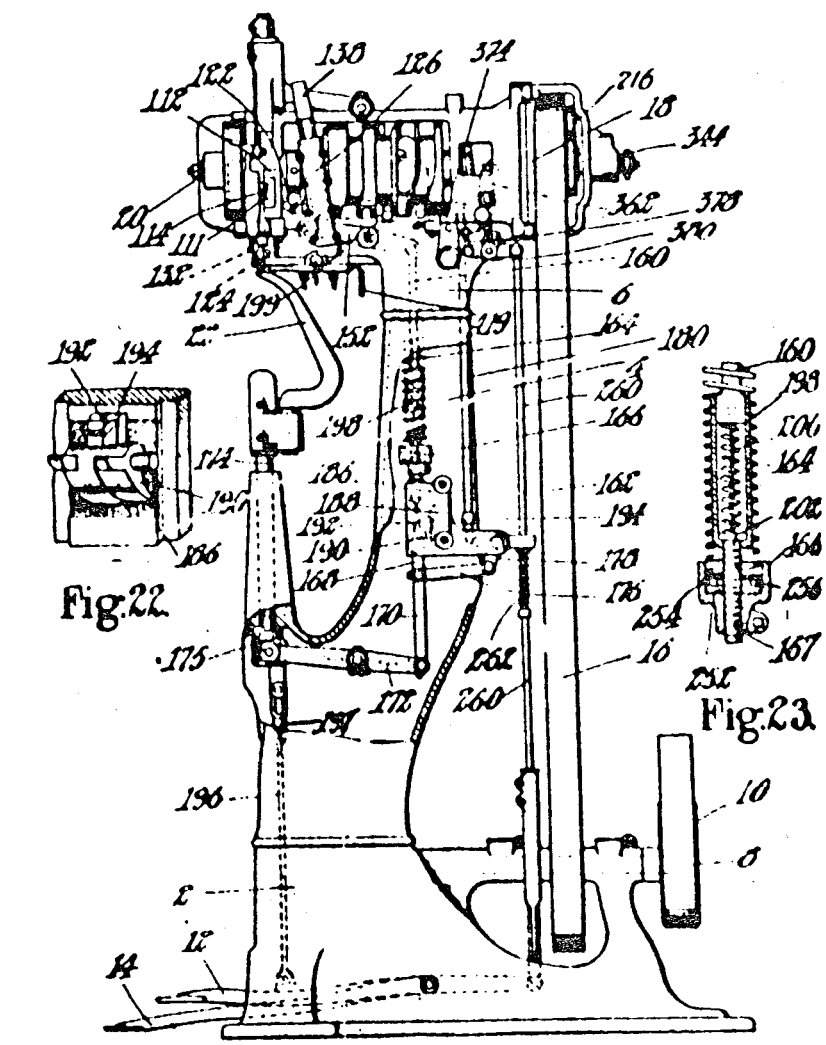

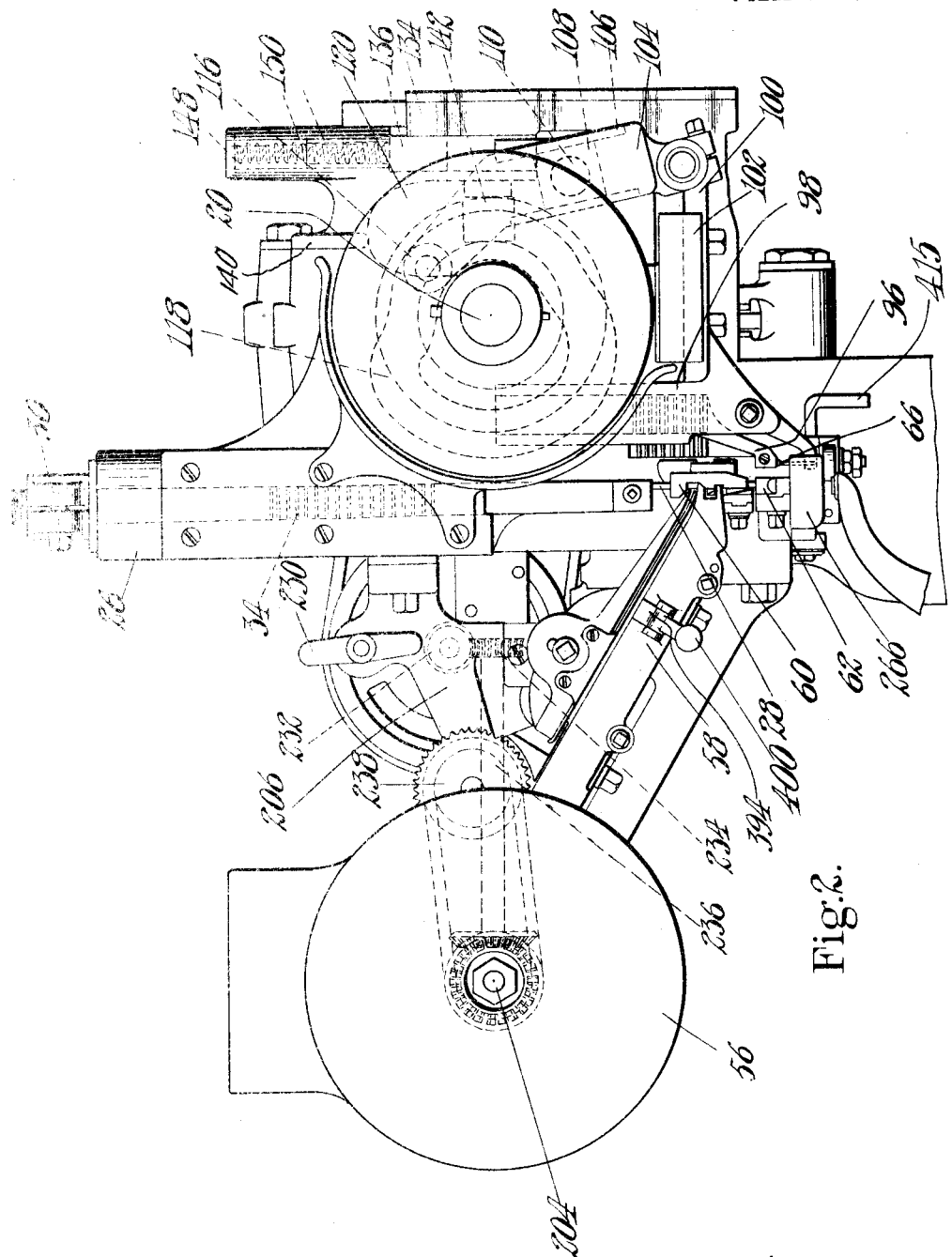

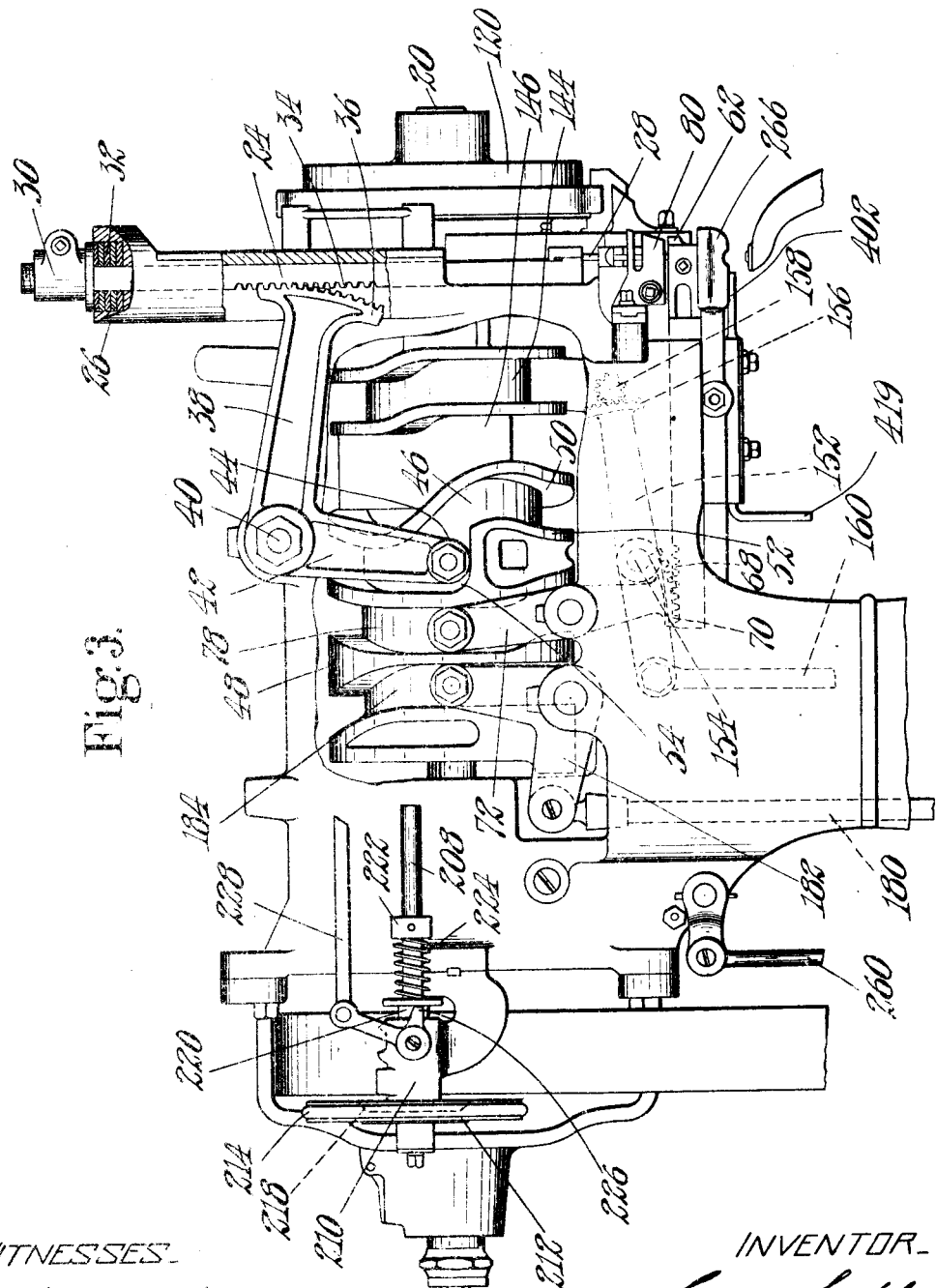

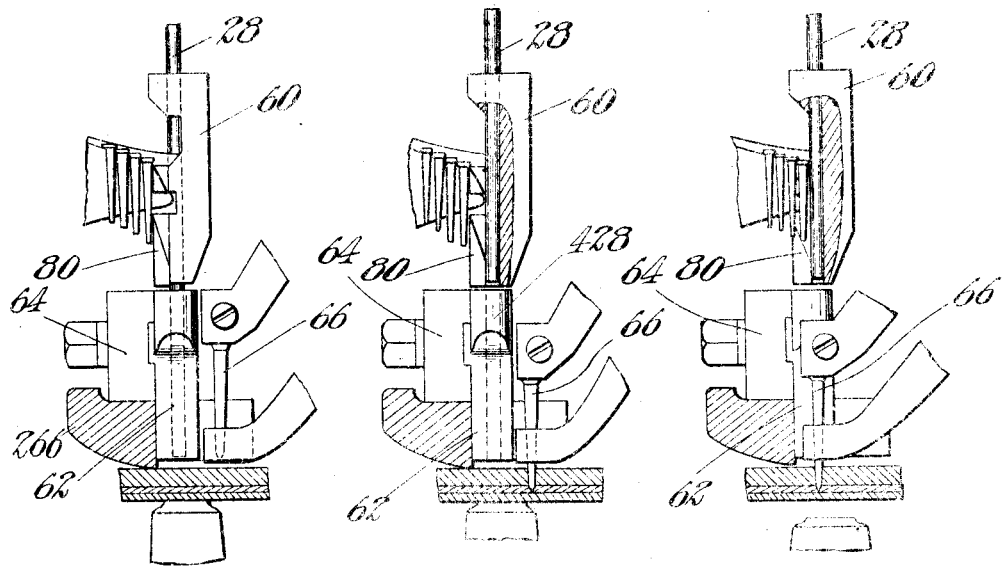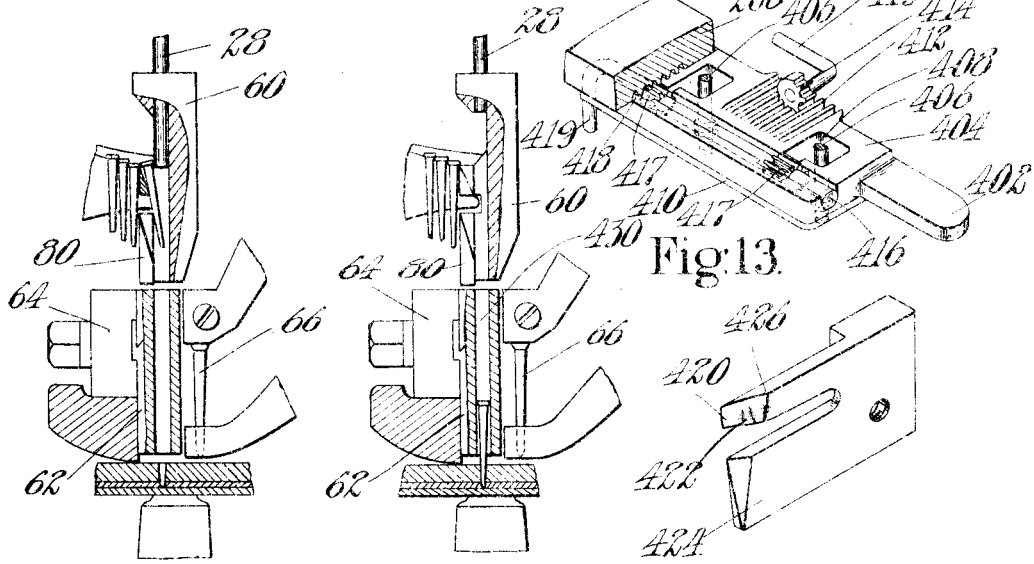

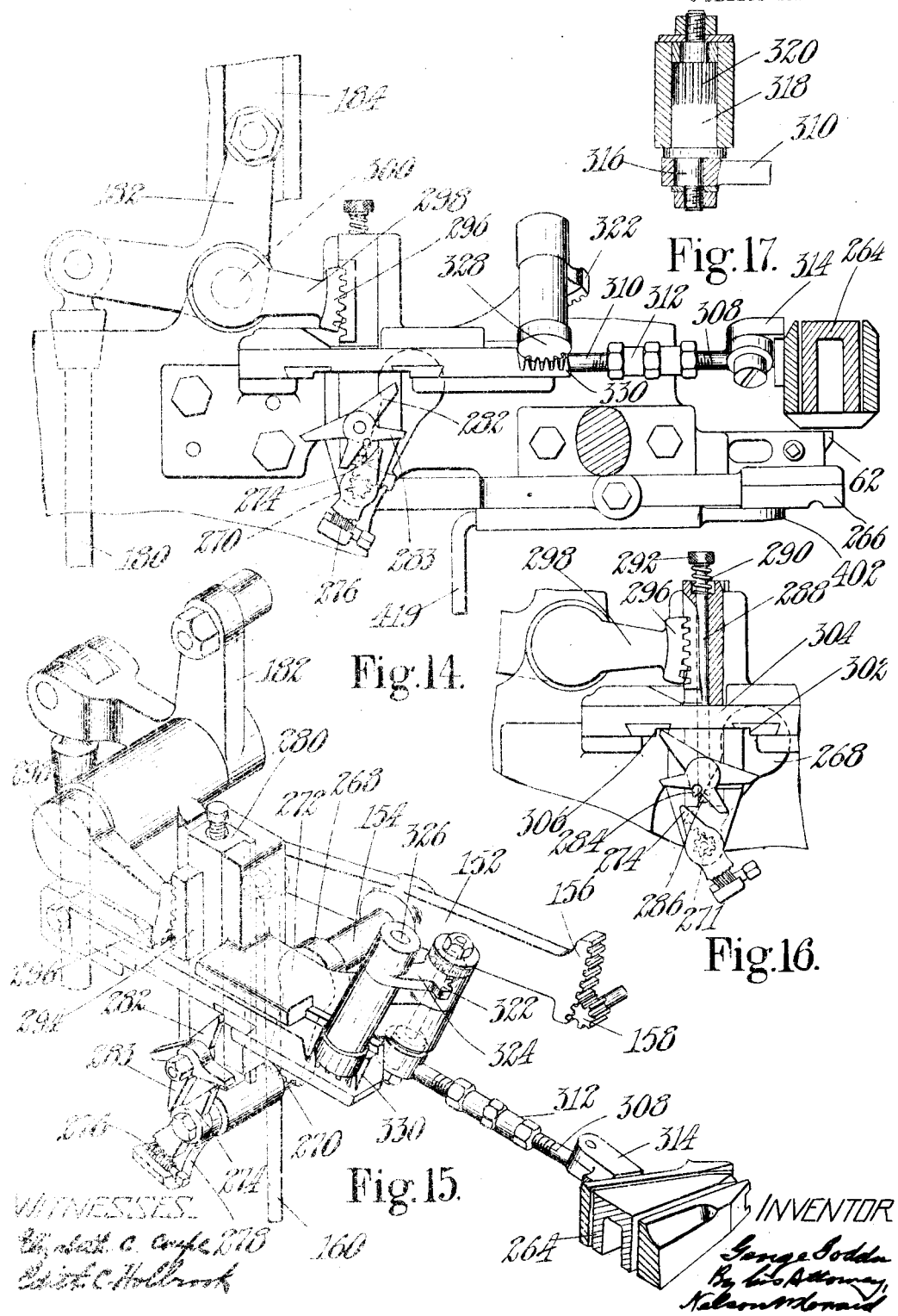

G. GODDU.
MACHINE FOR INSERTING FASTENINGS.
APPLICATION FILED FEB. 8, 1909.
1,030,775.
Patented June 25, 1912.
8 SHEETS—SHEET 7.
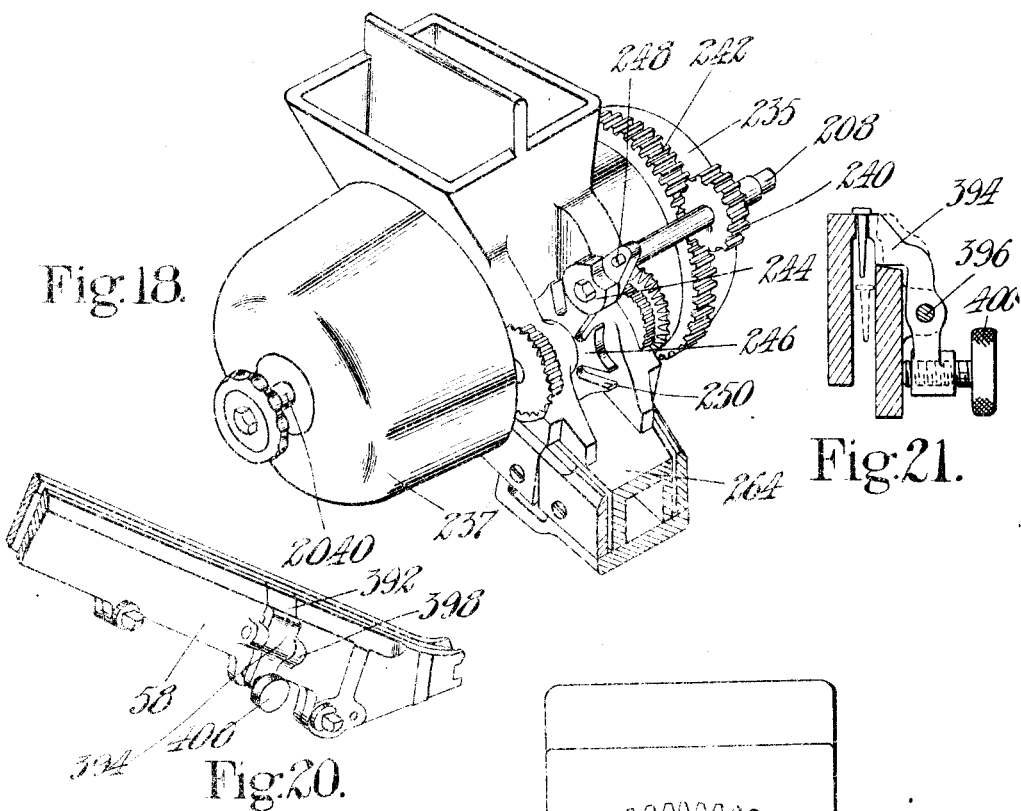
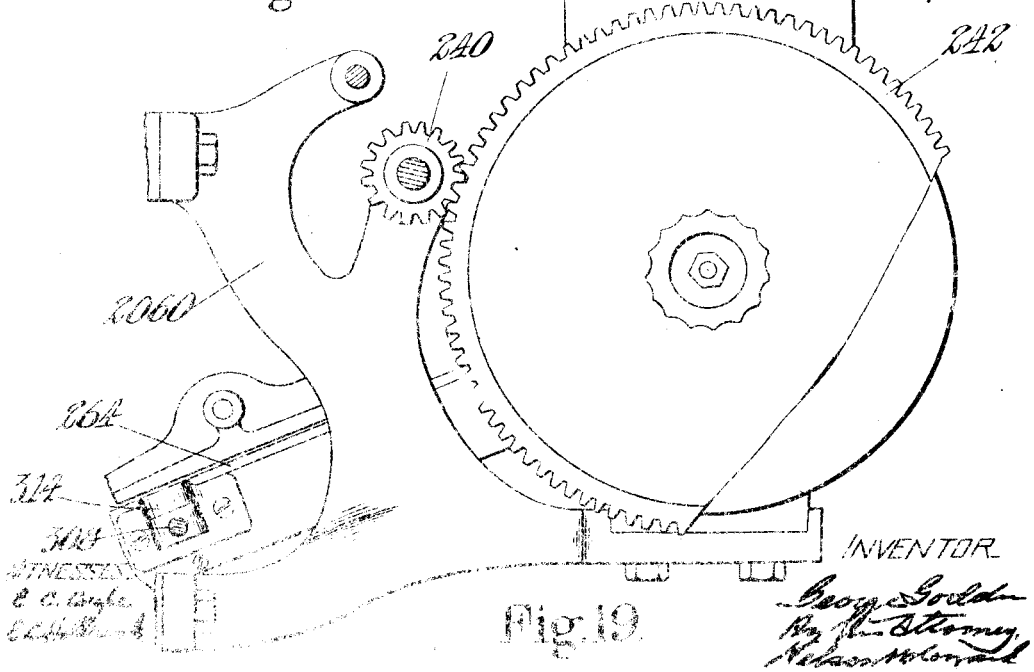

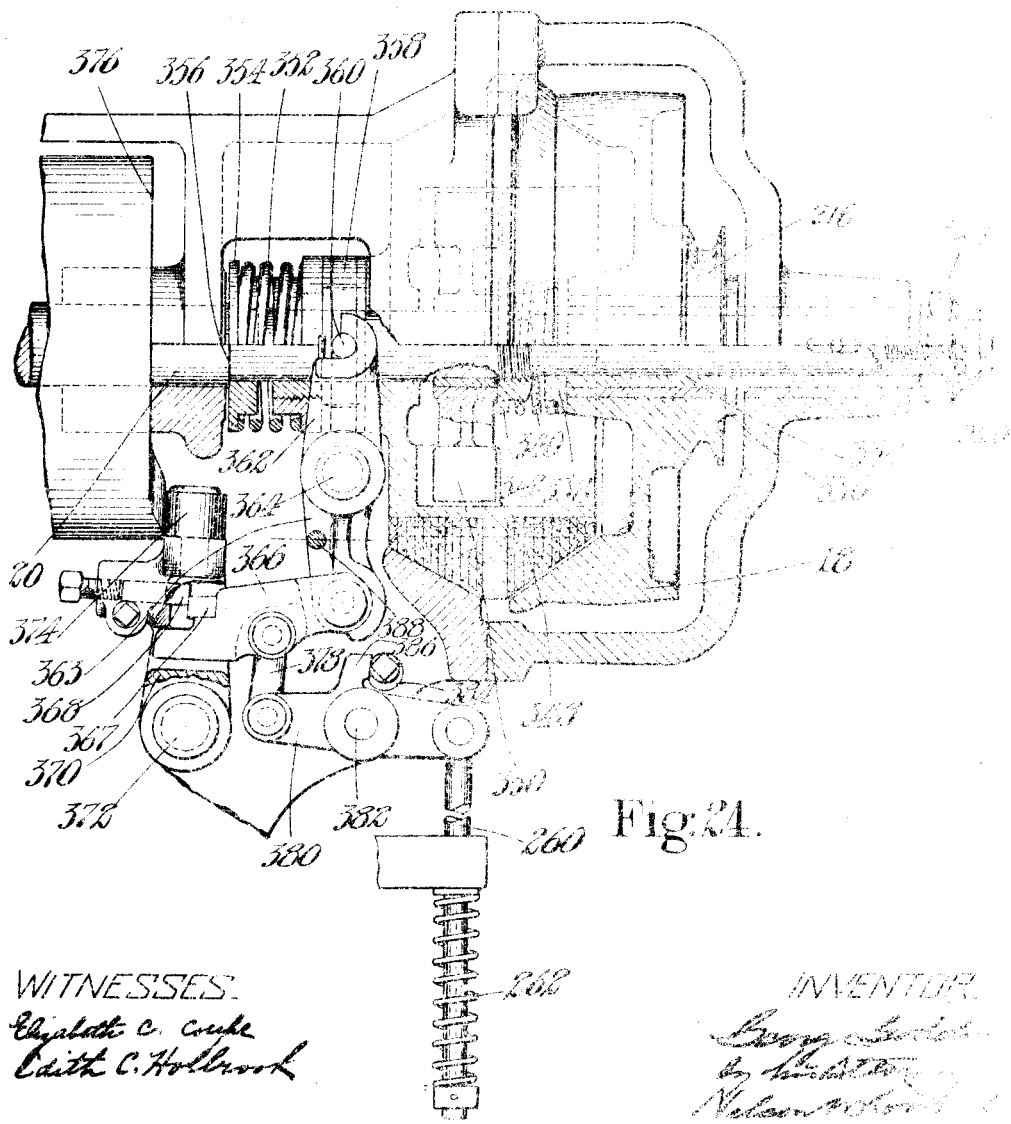

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING FASTENINGS.

1,030,775.

Specification of Letters Patent.

Patented June 25, 1912.

Application filed February 8, 1909. Serial No. 476,648.

*To all whom it may concern:*

Be it known that I, GEORGE GODDU, a citizen of the United States, residing at Winchester, in the county of Middlesex and Commonwealth of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting fastenings and particularly to machines for inserting previously formed fastenings. As herein used the term "fastening" is intended to include within the scope of its designation things having other than fastening functions, but which are adapted to be handled by machines of the type to which the invention particularly relates.

Efficient fastening inserting machines are in use in many arts, the machine herein illustrated being intended especially for use in the manufacture of boots and shoes, but the commercial success attending the use of such machines is dependent, to a great extent, upon two things, namely: the speed at which the machine performs its work and the rapidity with which the work may be presented to the machine. Of these two elements of commercial success the latter depends for the most part upon the skill and quickness of the operator. The speed of operation, however, is a resultant of the organization and construction of the machine as a whole and in this respect machines in commercial use are not entirely satisfactory, for the reason that, owing to the low speeds at which they must be run, their capacity for performing work is inferior to the demand made upon them by the average operator and seriously handicaps the best operators.

A general object of the present invention, therefore, is to provide a machine for inserting fastenings which may be run at speeds higher than those attainable with machines of known construction and particularly to improve machines for handling previously formed fastenings in this respect.

A further object of the invention is so to improve the construction of machines of this type that they will be adapted for performing not only an increased quantity of work but also a superior quality of work.

Another object of the invention is to provide a machine which is adapted to be run at high speed and yet which is so constructed and arranged that there is a minimum of vibration and a minimum of wear.

Other objects of the invention relate especially to improvements in the construction and operation of the various elements which go to make up a machine of the type known as "loose nailing machines" that is, a machine adapted to handle previously formed nails in bulk and comprising usually a nail driving mechanism, a hopper, a raceway for conducting nails from the hopper to a point adjacent to the driving mechanism, a separator for separating the endmost nail from the others in the line in the raceway and delivering it to a nail receiving throat which constitutes usually a part of the driver passage, and an awl for forming a nail receiving opening in the work and having usually, and preferably, the further function of feeding the work between successive nail driving operations. It will be understood however that many of the objects of the invention herein pointed out relate to improvements in fastening inserting machines in general.

As above suggested, in the preferred embodiment of the invention the work is fed by the awl, and one of the most important features of the invention is the combination with an awl arranged to feed the work of a fastening receiving throat located, when in operative position, within the work feeding path of the awl, movable transversely to said path to place it out of the way of the awl during the work feeding movement of the latter and arranged to receive a fastening from a source of fastening supply when in its operative position. Among the advantages gained by this novel combination and its novel method of operation is greatly increased speed of the machine and to this contributes in a great measure the practicability of employing much lighter parts in the construction thereby avoiding the disturbing effects of the momentum of heavy moving parts, especially undesirable when many of them move in the same direction at the same time.

Another object of the invention is the provision of a construction in which there is a novel relation of the fastening inserting and fastening separating mechanisms, as well as a novel timing of the movements of said mechanisms whereby lightness of construction may be permitted without loss of efficiency or durability and whereby needless duplication of functions may be avoided.

In the illustrated embodiment of the invention, which comprises the usual elements of a loose nailing machine, a movable fastening receiving throat is provided, said throat having a driver passage into which the nail or other fastening drops to be operated upon by the driver. Fastenings pass from the hopper down the raceway into position to be operated upon by the fastening separating mechanism. The fastening-receiving throat is moved preferably transversely to the raceway, and in the construction shown is located just beneath the separator, the movements of the separator and throat being preferably so timed that the separator operates to deliver a fastening to the throat as it comes into operative position beneath the driver.

The invention is directed also to a novel relation of certain of the parts and to a novel timing of the movements of said parts, whereby the fastenings are prevented positively from moving out of the raceway during certain operative and inoperative movements of the several mechanisms intervening between the insertion of one fastening and the delivery of the next fastening to be inserted.

In the preferred embodiment of the invention the driver is utilized for this purpose, and for this purpose has imparted to it a novel movement or a novel succession of movements. In this aspect of the invention, the driver will be raised in such manner after the fastening inserting operation that it blocks the passage of the fastenings from the raceway into the driver passage while the separator is withdrawn from in front of the endmost fastening in the line in order to enter between said fastening and the one next behind it. In the preferred embodiment of the invention in which a movable throat is employed, the raising of the driver after the fastening inserting operation will preferably be effected in a plurality of steps. Furthermore, since in the preferred embodiment of the invention the separator and throat will be moved in substantially identical directions and substantially simultaneously, one of the steps in the upward movement of the driver will comprise preferably a movement sufficient to permit the withdrawal of the throat out of the path of the awl during the work feeding operation, there being a dwell in, or other suitable timing of, the upward movement of the driver after it has cleared the throat so that the separator may be withdrawn from in front of the endmost fastening in the line and that this fastening may be forced by those behind it into contact with the driver in order that the separator upon its return movement may enter between this fastening and the one next behind it.

The invention aims further to improve the separating operation and to this end an important object of the invention is the provision of an improved separator which is constructed and arranged to coöperate with the driver in its novel movement or succession of movements in such manner that a substantially positive and uniform separating operation may be insured at all speeds. Preferably the separator will be shaped and arranged to coöperate with a stepwise movement of the driver into its uppermost position in such manner that there are a plurality of steps in the separating operation.

In the illustrated embodiment of the invention, the driver has imparted to it a three-step upward movement with dwells intervening between the steps, but it will be understood that a stepwise movement of the driver, in the sense that the term "step" is used in the specification and claims, does not necessarily involve a dwell between the steps.

Another important object of the invention is to provide, in a fastening inserting machine in which there are a plurality of sources of fastening supply, improved fastening selecting means whereby the fastenings may be suited, preferably automatically, to the work into which they are to be inserted. Preferably said fastening selecting means comprises a plurality of raceways carrying fastenings of different kinds from the different sources of supply, and improved means for bringing each of said raceways into coöperative relationship to the inserting mechanism. Preferably said means also comprises or is associated with means for causing the fastening selection to be determined by the thickness of the work, and an important feature of the invention is the provision of means controlled by the thickness of the work for effecting a shifting of the raceways which is very sensitive to a slight change in the thickness of the work near the line between the thicknesses for which shifting is desired, whereby shifting of the raceways may be insured at exactly the right point.

Another object of the invention is the provision of a work gage adjustable in two directions at right angles to each other and means for effecting such adjustments whereby the proper relationship of said gage to the awl and inserting mechanism may be maintained for different lengths of work feed and whereby the usual gaging functions may also be performed.

Still other objects of the invention will be apparent from a consideration of the following description and claims, this application as to the common subject-matter being a continuation of my co-pending application Serial No. 396,831, filed Oct. 10, 1907.

In the accompanying drawings,—Figure 1 is a side elevation of a machine embodying the preferred form of this invention; Fig. 2 is a front elevation of the head of the machine; Fig. 3 is a side elevation of the machine head viewed on the left hand of an observer standing in front of the machine; Fig. 3ª is a perspective detail of the mechanism for controlling the depth of penetration of the awl into the work. Fig. 4, is a perspective view of the fastening inserting mechanism showing the parts in the relations to each other in which they stand when the machine is at rest or immediately after the insertion of a fastening; Fig. 5 is a perspective view, similar to Fig. 4, but showing the parts in the relation to each other in which they stand when the awl has fed the work to bring the awl hole into position beneath the driver and before it has been withdrawn from the work to return to its initial position; Fig. 6 is a perspective view, similar to Figs. 4 and 5, showing the parts in the relation to each other in which they stand when the awl has been returned to its initial position, when the throat has been brought again beneath the driver and received a nail or other fastening and when the driver is about to descend to drive the nail; Figs. 7, 8, 9, 10 and 11 illustrate various steps in the fastening separating and work feeding operations and show especially the coöperation of the driver with the separator in the separating operation; Fig. 12 is a perspective view of the separator blade; Fig. 13 is a perspective view of the edge gage and the means for adjusting it in two directions; Fig. 14 is a side elevation of the mechanism for automatically shifting the double raceway; Fig. 15 is a perspective view of the mechanism shown in Fig. 14; Fig. 16 is a detail side elevation of a portion of the mechanism shown in Fig. 14, showing the parts in position to shift the raceway in a different direction; Fig. 17 is a detail sectional view of the eccentric constituting a part of the mechanism for shifting the double raceway and locking it in the position into which it is moved; Fig. 18 is a perspective view of the multipart hopper and the associated mechanism employed with the double raceway; Fig. 19 is a rear elevation of the hopper and its supporting bracket; Fig. 20 is a detail perspective view of the single raceway showing the trap through which the nails may be taken from the raceway; Fig. 21 is a detail sectional view of the trap shown in Fig. 20; Fig. 22 is a detail perspective of the locking mechanism constituting a part of the horn operating mechanism; Fig. 23 is a detail section of the yielding connection between the awl depth controlling mechanism and the horn release mechanism; Fig. 24 is a detail side elevation of the starting clutch, parts being shown in section; Fig. 25 is a detail of the device through which the double cone clutch member is held in neutral position when it is desired to turn the machine over by hand.

The illustrated machine has a supporting frame comprising a base 2, a standard or column 4 and a head 6. In the base are mounted a counter shaft 8 to which is attached a pulley 10 connected to any suitable source of power and the horn depressing and clutch operating treadles 12 and 14, respectively. The counter shaft 8 also carries a second pulley rigidly attached to it and connected by a belt 16 to a loose pulley 18 upon the main driving shaft 20 in the head 6. In the upright portion of the frame or standard 4 are mounted the work support or horn 22 and the horn release controlling mechanism, hereinafter more specifically described.

In the head 6 are mounted the various parts of the fastening inserting mechanism and the cams which control the timing of the operations of the various parts of the machine as a whole. Inasmuch as the illustrated machine is of the type known as "loose nailing machine," for the purposes of this description the term "nail" will be used instead of fastening in describing the various parts of the fastening inserting mechanism and the various operations performed by the machine.

The fastening inserting or nail driving mechanism comprises a driver bar 24 mounted to reciprocate vertically in a guideway in an upright part 26 of the machine head and having clamped to its lower end a driver 28. At its upper end the driver bar 24 is provided with an adjustable stop 30 which impacts in the movement of the driver upon a cushion 32 surrounding the driver bar and contained in a countersunk opening in the upper end of the part 26. Upon its rear side the driver bar 24 is provided with rack teeth 34 which are engaged by the teeth of the segment rack 36 carried upon the substantially horizontal arm 38 of a bell-crank lever pivoted at 40 upon the machine head. The other arm 42 of the bell-crank driver operating lever carries a cam roll 44 which travels in a cam groove 46 formed in a cam wheel 48 mounted upon the driving shaft 20.

The driver operating cam is of peculiar construction, and may conveniently be described as a momentum cam. The cam groove 46 is provided with opposed walls 50 and 52 which are parallel throughout the greater part of their extent so that both the upward and downward movements of the driver are substantially positively controlled throughout the greater part of the reciprocatory movement of said driver. In order, however, to provide a momentum or blow-like driving of the nail the positive control of the movement of the driver by the cam is preferably relaxed during a predetermined part of the movement of said driver, and this relaxation of control or release of the driver will preferably take place during the latter part of its downward movement or its movement in the nail driving direction. Preferably, however, the control of the cam over the movement of the driver will be maintained to the extent that the driver will be compelled to move at not less than a predetermined velocity throughout the whole of its driving movement and will be compelled to move to a predetermined limit in the driving direction. To this end the wall 50 of the groove 46 will be given a cam shape, such that it will compel the movement of the driver at not less than a predetermined speed in the event that the momentum of the driver is not sufficient to carry it at a greater speed. To permit the driver to travel at a greater speed than that at which it would be caused to travel by the compelling action of the side or wall 50 of the cam groove 46, the wall or side 52 is so shaped that there is a recess or pocket 54 in the groove 46 into which the cam roll 44 may be carried as the momentum of the driver bar and driver causes it to move away from the wall 50. It will be noted that the wall 50 of the cam groove 46 impels the driver in its downward direction and prevents too rapid movement of the driver in the upward direction, and that, on the other hand, the wall 52 serves to effect the upward movement of the driver but resists too rapid movement in the downward direction except as hereinabove described when the driver has reached a predetermined point in its downward movement, when the control of the wall 52 over the downward movement is interrupted by the provision of the recess or pocket 54. It will be noted further that after the driver and driver bar have been permitted to descend under their acquired momentum, which may conveniently be referred to as the acquired momentum of the driver, the wall 50 of the cam groove again comes into contact with the cam roll 44 and causes the driver to deliver upon the head of the fastening a second or setting blow in the event that the driving blow has not sunk the head to the proper depth.

The nails to be driven are contained in a hopper 56 from which they are conducted by a raceway 58 to a point adjacent to the driver passage in the driver guide 60, said guide being broken away at the side adjacent to the raceway whereby the nails may be introduced one at a time from said raceway into said driver passage. Below the driver guide 60 is a nail receiving throat 62 mounted upon a slide 64 and movable with said slide transversely to the path of feed of the work and transversely to the raceway 58. Transverse movement of the throat 62 and slide 64 is provided to withdraw the throat from the path of feed movement of the awl 66, hereinafter to be described, in order to permit the awl to bring the nail receiving opening which it has formed in the work beneath the driver passage.

The slide 64 is guided in an opening in the machine frame and is provided at its rear end with rack teeth 68 with which engage the teeth upon a segment rack 70 upon the lower end of a slide actuating lever 72 pivoted at 74 on the machine head and carrying at its upper end a cam roll 76 entering a cam groove 78 in the cam wheel 48, said cam groove 78 being so shaped as to effect movement of the throat 62 into operative position and to withdraw it out of the path of the awl at the proper times in the cycle of operations of the machine. The nail separator 80 is also mounted upon the slide 64 to move therewith and is yieldingly connected with said slide so that on the return movement of the slide 64 the separator may move relatively to said slide in the event that it meets an obstruction in the raceway. The connections between the separator and slide comprise a cylindrical slide 82 upon which is mounted a bracket 84 provided with a forwardly projecting portion 86 to which the separator blade 80 is attached. The bracket 84 is adjustable upon the slide 82 in a direction substantially parallel to the movement of the awl, so that the separator may be adapted to nails of varying dimensions. The cylindrical slide 82 is guided in a cylindrical opening in the machine head and has socketed within it a spring which bears at one end against the end of a socket in the slide 82 and at its other end against the end of a socket in a second cylindrical slide mounted within the slide 82.

The slide 90 is provided with a pocket in which is received a lug 92 extending up from the slide 64, a slot 94 being provided in the slide 82 whereby said slide may move relatively to said lug to permit the separator to yield when it meets an obstruction. The spring 88 tends normally to keep said slide 82 in such relation to the slide 64 that the lug 92 will be in the rear end of the slot 94.

The awl 66 is clamped in an awl bar 96 which has a straight vertical portion mounted to slide in a vertical guideway in an awl carrying frame 98, said frame 98 being provided with a horizontal dove-tail portion 100 arranged to slide in a similarly shaped slideway formed in a bracket 102 bolted to the machine head. The awl bar 96 is arranged to reciprocate vertically in its carrying frame 98 and to be moved horizontally with said frame. The mechanism for effecting the horizontal movement of the frame 98 comprises a floating lever 104 provided with a guideway 106 in which is slidably mounted a fulcrum block 108 pivoted upon a stationary fulcrum pin 110 carried by a block 111 adjustably mounted in an upstanding portion 112 of the machine head.

Vertical adjustment of the fulcrum pin 110 varies the relative length of the two arms of the floating lever 104 and therefore varies the amount of horizontal movement of the frame 98 and the amount of feed movement of the awl. For convenience in adjusting the fulcrum pin 110, the upstanding portion of the frame 112 is provided with a nail-spacing scale 114 with which coöperates an indicator on the fulcrum pin carrying block 111. At its upper end the floating lever 104 is provided with a cam roll 116 traveling in a cam groove 118 formed in the rear face of the cam disk 120 mounted upon the forward end of the main driving shaft 20.

Upon the rear face of its vertical portion the awl bar 96 is provided with rack teeth with which engage the teeth upon a segment rack carried upon one arm 122 of an awl operating lever. The awl operating lever is fulcrumed upon a rock-shaft 124, being provided with a sleeve 125 which surrounds said rock-shaft. The arm 122 of the awl operating lever is attached to the inner end of the sleeve 125 and the other arm 126 is attached to the other end of said sleeve.

The arm 126 of the awl operating lever comprises a casing in which is mounted a slide bar 128 broken at 130 into two separable sections, the lower section 128o being provided with rack teeth which mesh with the teeth of a pinion 132 carried at the outer end of the rock-shaft 124 and the upper section 128t receiving through an opening in the back of the casing which forms the arm 126 a pivot pin 134 upon a block 136 arranged to be moved vertically in a lever 138 pivoted at one end at 140 to the machine head and at its other end carrying a cam roll 142 which enters a cam groove 144 in a cam wheel 146 on the main shaft 20.

The lever 138 is provided with a spring socket 148 in which is contained a spring 150 which holds the block 136 yieldingly in its lowermost position. The power which operates the awl to cause it to penetrate the work being transmitted to the arm 126 of the awl operating lever through the lever 138, the effective length of the arm 126 is therefore varied by varying the vertical position of the fulcrum pin 134.

In order that the work penetrating movement of the awl may be proportioned to the thickness of the work, mechanism is provided for automatically varying the vertical position of the fulcrum pin 134 in accordance with the thickness of the work. This mechanism comprises a lever 152 attached to a rock-shaft 154 having bearings in the machine head, said lever carrying at its forward end a segment rack 156 which engages a pinion 158, see Fig. 3, upon the inner end of the rock-shaft 124. The rear end of the lever 152 is connected by a rod 160 to a slide 162 constituting a part of the work thickness compensating mechanism through which the releasing movement of the horn is controlled for the work feeding operation. Since the position of the slide 162 is determined by the thickness of the work in a manner hereinafter to be described, the vertical position of the fulcrum pin 134 will be controlled through the rod 160, lever 152, segment 156, pinion 158, rock-shaft 124, pinion 132 and slide 128.

The horn release mechanism herein shown is substantially the same in its construction and principle of operation as that shown in my co-pending application, Serial No. 409,352, filed Jan. 4, 1908, except that the mechanism herein shown is mounted in the column 4 to operate in the reverse direction from that in which the mechanism in the co-pending application operates. In the illustrated construction the slide 162 is normally depressed into its lowermost position by a horn raising and work clamping spring 164 bearing at its upper end against a crosspiece in the column 4 and at its lower end being received in an annular socket 166 surrounding and clamped upon a threaded rod 167 connected to the slide 162.

The pressure of the spring 164 is transmitted to the horn 22 through connections comprising toggle links 168, 170 and a lever 172 fulcrumed in the column 4 and connected at its rear end to the toggle link 170 and at its forward end connected by a block and slot connection to a member 175 into which the horn supporting rod 174 is threaded. The lever 172 is forked at its forward end. The straightening of the toggle is effected through a link 176 connected at one end to the knee joint of the toggle and at its other end to one arm of a bell-crank lever 178, the other arm of which is connected by a rod 180 to an arm of a second bell-crank lever 182. The other arm of the lever 182 carries a cam roll entering a cam slot 184 in the cam wheel 48. When the toggle is broken, the spring 164 is preferably locked against action upon the horn, as in the co-pending application above referred to, and said locking means comprises as in said application a ratchet plate 186 carried by a casing 188 in which the slide 162 is mounted to reciprocate vertically, pawls 190 being mounted upon said slide and arranged to engage the ratchet when the toggle is broken, said pawls being held out of engagement with said ratchet when the toggle is straightened by the pressure of a finger 192 attached to the toggle link 168 upon the tails 194 of said pawls.

The horn may be depressed when the machine is at rest in order to place work upon it or remove work from it by suitable connections with the horn depressing treadle 12, said connections comprising, in the illustrated construction, a rod 196 threaded at its upper end into a piece 197 having a pin and slot connection with a forked extension of the member 175, said rod being pivotally connected at its lower end to the treadle 12.

The mechanism for automatically controlling the depth of penetration of the awl into the work has preferably only a limited range of movement, since when operating upon work which is very thick it is unnecessary to vary the depth of penetration of the awl and therefore when the thickness of the work exceeds a predetermined amount the awl depth controlling mechanism ceases to cause variations in the movement of the awl corresponding to variation in the thickness of the work. A stop 199 in the path of the segment carrying end of the lever 152 limits the movement of the awl depth controlling mechanism.

In order that the free movement of the horn may not be interfered with when the thickness of the work exceeds that for which automatic variation of the awl movements is provided, a yielding connection is provided between the rod 160 and the slide 162 whereby when the rod 160 has reached the upper limit of its movement, that is when it has set the awl operating mechanism to give the greatest amount of penetrative movement to the awl, the slide 162 may be moved relatively to the rod 160 to permit the horn 22 to accommodate itself to work of still greater thickness. This yielding connection comprises a socket 198 located within the spring 164 and connected to the rod 160 and having confined within it and bearing against the lower end of rod 160 a spring 200. A second rod 167 passes through an opening in the bottom of the socket 198 and within said socket is provided with a piston 202 bearing upon the lower end of the spring 200. The spring 200 is strong enough so that the thickness of the work will be accurately gaged by the automatic controlling mechanism up to the maximum for which this mechanism is effective, and that beyond the said maximum it will be compressed to permit the relative movement of the slide 162 and the rod 160. The downward movement of the slide 162 causes a positive downward movement of the rod 160 after the spring 200 has expanded sufficiently to bring the piston 202 into contact with the bottom of the socket 198 in the event that said spring has been compressed.

During the horn release operation of the horn controlling mechanism there will be no movement of the awl through the awl depth controlling mechanism since at this time the slide 162 will be locked against movement and therefore the rod 160 will be held stationary. It will be noted that when the awl operating lever is turned about the rock-shaft 124 by the action of the lever 138 upon it the part 1280 of the slide bar 128, as it rolls about the pinion 132, will tend to move away slightly from the part 1281 and for this reason the slide bar 128 has been made in two separable sections in order that this slight downward pull may not affect the vertical position of the fulcrum pin 134. When the slideway for the block 136 in the lever 138 and the slideway for the slide bar 128 are substantially parallel, any movement of the bar 128 caused by variations in the thickness of the work will have no effect upon the awl since the parts are in what may be called neutral position, and no tendency to turn is imparted to the arm 126 of the awl operating lever by the movement of the slide 128 when the parts are in this neutral position, or in other words, when the angle between the slideway for the block 136 and the slideway for the slide bar 128 is zero.

Since the position of the awl will not be affected by any adjustment of the awl depth controlling mechanism when the two slideways are in the position just described, the parts are preferably so timed that the movement of the horn back into work gaging position will take place with the slideways in this position and that the machine will stop with the slideways in this position. It will therefore be seen that the horn may be depressed by the treadle 12 to permit work to be placed upon it or removed from it without any effect upon the awl. Moreover it will be noted that the awl has a fixed starting position by reason of the positive connection between the arm 126 and the awl bar 96 and that the range of movement of the awl from this starting position is varied by the means hereinabove described.

The novel mechanism hereinabove described for automatically controlling the extent of the work penetrating movement of the awl in accordance with variations in the thickness of the work is not claimed in this application but will be made the subject-matter of a continuing application.

The hopper 56 is attached to a counter shaft 204 mounted in a bracket 206 clamped to the machine head. Also mounted in this bracket is a second counter shaft 208 having a bearing 210 at the rear part of the machine head and having loosely mounted on its rear end a driving pulley 212 in a peripheral groove in which travels a belt 214. The belt 214 surrounds and travels in a peripheral groove in a hopper driving extension 216 of the loose pulley upon the shaft 20 to which the belt 16 transmits movement from the counter shaft 8. This loose belt pulley is constantly rotated and is arranged to be clutched to the shaft 20 by any suitable clutch mechanism, preferably that hereinafter described.

The loose pulley 212 may be clutched to the shaft 208 by any suitable clutch mechanism, such for example as that illustrated which comprises a cone 218 carried by a sleeve 220 surrounding the shaft 208 within the bearing 210, said sleeve being somewhat longer than the bearing 210 and having a flange upon its forward end between which and the collar 222 upon the shaft 208 is confined a spring 224 which tends normally to cause the sleeve 220 to move the cone 218 into clutching engagement with the loose pulley 212.

The sleeve 220 may be moved against the tension of spring 224 to move the cone to effect an unclutching of the pulley 212 from the shaft 208 by means of a forked bell-crank lever 226, one arm of which bears against the flange of the sleeve 220 and the other arm of which is connected to an operating rod 228 extended to the front of the machine and provided at its forward end with a finger hold 230. Between the fork members of the bell-crank lever is a downwardly extending lug which coöperates with stop members on the bearing 210 and limits the movement of said lever. When the bell-crank 226 is in the position shown in Fig. 3, the pulley 212 is unclutched from the shaft 208 and the hopper is at rest. It will be noted that by this arrangement the hopper may be kept in motion while the fastening inserting mechanism is at rest. This is frequently desirable in order to keep the raceway properly supplied with nails.

The counter shaft 208 is provided at its forward end with a worm 232 which drives a worm-wheel 234 upon a cross shaft 236 extending between the shaft 208 and the shaft 204, said shaft 236 having at its other end a bevel gear meshing with a bevel gear upon the rear end of the shaft 204. A rotary raceway clearer 238 is mounted upon a third counter shaft having bearing in the bracket 206 and is provided at its rear end with a belt pulley which is connected with a belt pulley upon the shaft 208.

When it is desired to use more than one kind of nail or length of nail in the machine, a multipart hopper, such as that shown in Fig. 18, is used. The bracket 206 is replaced by a bracket 2060 and the two hoppers 235 and 237 are mounted upon a single shaft 2040, being rigidly attached to said shaft, the rear hopper 235 being provided with a peripheral gear 242 with which meshes a pinion 240 upon the shaft 208. To the forward end of the shaft 208 is attached the pin wheel 244 of a Geneva stop mechanism through which the raceway clearers are mounted, there being a clearer for each raceway and the clearer shaft having mounted upon it between the clearers the star wheel 246 of said stop mechanism.

The pin 248 upon the pin wheel 244 entering successively the slots 250 in the star wheel 246 imparts to the raceway clearers an intermittent rotary movement. Extending from the hoppers to the fastening inserting mechanism is a raceway 264 provided with a plurality of nail guides and jointed intermediate its length, so that its fastening delivering end may be shifted relatively to the driver guide to bring either of the raceway grooves into operative relation to the driver passage, this raceway being substantially the same as that shown in the patent to George Goddu, No. 898,573, granted September 15, 1908.

The mechanism for shifting the double raceway is shown, especially in Figs. 14, 15, 16 and 17. This mechanism comprises an oscillatable member, the angular position of which is determined by the thickness of the work gaged between the horn 22 and the work abutment 266, and the shifting mechanism proper. The direction of the operation of the shifting mechanism is determined by the angular position of the member which is set by the thickness of the work. Since the mechanism which operates the awl is also controlled in its movements by the thickness of the work to be operated upon, the member which is to be set to determine the direction of shift of the raceway is conveniently controlled from a part of the awl depth controlling mechanism. To this end the rock-shaft 154 to which is attached the lever 152 carries at its other end an arm 268, provided at its lower end with rack teeth which mesh with a pinion 270 upon a rock shaft 271 mounted in bearings in a bracket 272, said rock-shaft carrying at its end remote from the pinion an adjustable pawl tipper comprising a pointer-like member 274 loosely mounted upon said shaft and provided upon one arc shaped end with worm threads which engage corresponding threads of a worm 276 carried in an arm 278 rigid with said rock-shaft. The angular position of the pointer 274 upon the rock-shaft can be varied by turning the worm 276. The angular relation of the pointer 274 to the bearing of the rock-shaft is determined by the thickness of the work. This last-mentioned angular relation of the pointer 274 determines the direction of operation of the shifting mechanism proper now to be described.

Mounted to reciprocate vertically in a guideway in the bracket 272 at one end of the main shaft 20 is a slide pivoted upon its outer face near its lower end a double pawl 282 having a double tail 283. At its lower end and projecting downward between the two parts of the tail is a V-shaped locking member 284, coöperating with a similar V-shaped lug 286 carried upon the lower end of a rod 288 passing down through the center of the slide 280 and held in its uppermost position by a spring 290 confined between a head 292 and the socketed upper end of the slide 280. The tail 283 of the pawl 282 is axially offset somewhat from the two arms of the pawl and is arranged to be engaged by the pointer 274 of the pawl tipper when the slide 280 is in its lowermost position.

Formed upon the front face of the slide 280 is a rack bar 294 which is engaged by a segment rack 296 upon a rock arm 298 rigidly attached to a rock-shaft 300 mounted in bearings in the machine frame and carrying at its other end the angle lever 182 of the horn operating mechanism. As this angle lever is rocked at each rotation of the main shaft 20 by the cam groove 184 in the cam wheel 48, the slide 280 will be reciprocated vertically and the pawl 282 will be carried up away from and down into engagement with the pointer 274 of the pawl tipper. If the pointer 274 is in the position shown in Fig. 14, it will engage the right-hand part of the tail 283 of the pawl as the pawl is moved downwardly, and will rock the pawl about its pivot upon the slide 280 so that its right-hand arm is higher than the left-hand arm, the locking member 284 upon the pawl slipping by the coöperating lug 286 upon the rod 288 which is then pressed against the left-hand side of said member 284, thereby holding the pawl in the position shown in Figs. 14 and 15.

As the slide 280 is moved upwardly in its reciprocating movement it will carry with it the pawl in the position into which it has been turned and locked, and the upper or right-hand arm of the pawl will engage the shoulder 302 upon the horizontal slide 304 mounted in the bracket 272 and connected by suitable connections, hereinafter to be described, to the double raceway. Continued upward movement of the slide 280 will cause the pawl as it is forced to turn about its pivot by its engagement with the under side of the slide 304 to push the shoulder 302 and with it the slide 304 toward the right. If the pointer 274 of the pawl tipper be in the position shown in Fig. 16, the pawl will be rocked about its pivot upon the downward movement of the slide 280, so that its left-hand arm is higher and so that the lug 286 passes over to the right-hand side of the locking member 284 and locks the pawl in the position shown in said figure. When the pawl is in this position, it will engage upon its upward movement the shoulder 306 upon the slide 304 and will move said slide toward the left.

The connections between the slide 304 and the double raceway 264 comprise oppositely threaded rods 308 and 310 connected by an adjusting nut 312, the rod 308 being pivotally connected with a lug 314 upon the side of the double raceway 264. The rod 310 receives in an opening at one end an eccentric pin 316 carried upon the lower end of a rock-shaft 318 mounted in a bearing in the bracket 272, said rock-shaft having formed upon its upper end a pinion 320 with which meshes a segment gear 322 formed upon the end of a rock arm 324 upon the upper end of a rock-shaft 326 also mounted in a bearing in the bracket 272 and carrying at its lower end a segment gear 328 which meshes with rack teeth 330 formed upon the slide bar 304, the rack teeth 330 being formed at an inclination to the side of the slide 304 and the bearings for the rock-shafts 326 and 318 being correspondingly inclined, this inclination serving to prevent binding when the inclined raceway is moved.

The shifting movement of the slide 304 is sufficient to turn the eccentric pin 316 around from one dead center to the other with respect to the rod 310 so that the raceway is automatically shifted and locked in the position into which it is moved. It will be noted that the multiplication of the movements of the horn is such that a comparatively slight movement is sufficient to turn the pointer 274 from one side of the axis of oscillation of the pawl 282 to the other, and that when it is so turned very little force is required to effect the turning of the pawl. The mechanism is therefore very sensitive and at the same time positive, being adapted to maintain the raceway in position to deliver one kind of nails continuously as the work approaches the thickness for which another kind of nails is desired and then to effect the shifting of the raceway at exactly the desired point.

It now remains to describe the clutch through which the loose pulley driven by the belt 16 is clutched to the shaft 20 to start the machine. This clutch is shown in detail in Figs. 24 and 25. The loose pulley is indicated at 18 in Fig. 21 and is mounted upon a sleeve 334, being confined upon said sleeve by a flange 336 formed integral with the sleeve and bearing against one end of the pulley and a washer 338 mounted upon the shaft 20 and pressed by a spring 340 against the other end of said pulley. The sleeve 334 is adjustable longitudinally of the shaft against the tension of the spring 340, said spring being confined between the washer 338 and a collar 342 threaded upon the shaft 20.

Adjustment of the sleeve and with it the pulley is effected by a nut 344 threaded upon the end of the shaft 20 and bearing against the end of the sleeve, said nut being set in its adjusted position by a set screw 346 threaded into the end of the shaft. The clutch is of the type sometimes designated as "double cone clutch", that is a double cone friction member 348 is mounted upon the shaft to move longitudinally thereof either into frictional engagement with an interior cone upon the pulley 18, or with a similar cone upon the frame of the machine, the movement into engagement with the cone upon the pulley 18 serving to clutch the pulley to the shaft to start the machine and the movement into engagement with the cone upon the frame of the machine serving to frictionally stop the rotation of the shaft.

The double cone friction member may be mounted upon the shaft for movement longitudinally thereof in any suitable or usual way, being caused to rotate with the shaft in the present construction by a spider 350 fitting loosely into openings provided for it in the interior of said friction member. In the illustrated construction the motor through which the friction member 348 is moved into clutching engagement with the pulley 18 is arranged to exert its counter thrust upon the shaft longitudinally thereof whereby no endwise movement of the shaft in the machine frame is caused. To this end a spring 352 is provided for effecting the clutching movement of the friction member 348, said spring being confined between a collar threaded upon the forward end of the hub of said member and a collar 354 bearing against a shoulder 356 upon the shaft 20.

The spring 352 is normally under compression and tends to move the friction member 348 into clutching engagement with the pulley 18. The means for moving the friction member 348 out of clutching engagement with the pulley 18 and into braking contact with the machine frame comprises a ring 358, loosely confined upon the hub of the friction member 348 between bearing washers and provided with trunnions 360 engaged by the arms 362 of a forked lever 363 fulcrumed at 364 upon the machine frame, and having pivoted to its lower end a catch-carrying lever 366 having a catch 367 arranged to engage an adjustable catch 368 upon a lever 370 fulcrumed at 372 upon the machine frame, and carrying at its upper end upon a vertical pivot a cam roll 374 bearing against a face cam 376 upon the cam wheel 48.

A link 378 connects one arm of a lever 380 fulcrumed at 382 upon the machine frame to the catch carrying lever 366, the other arm of said lever 380 being pivotally connected to the treadle controlled clutch actuating rod 260. The spring 262 surrounding said rod tends to keep it in its lowermost position and therefore to maintain the catch 367 in operative relation to the catch 368. The amount of movement required to trip the clutch may be varied by turning the eccentric 384 carrying a stop with which engages a stop arm 386 upon the lever 380.

If it is desired to hold the friction member 348 in the position in which it engages neither the loose pulley 18 nor the machine frame a stop 388 mounted in the machine frame and pressed normally toward the trunnion operating lever by a spring 390 may be turned so that it is released from the bayonet lock by which it is normally held out of the path of the lever 363 whereby said spring 390 presses it into the path of said lever and stops the friction member 348 in its intermediate position.

When it is desired to adjust the tension of the spring 164 which operates to move the horn 22 into clamping relation to the work, the socket 166 may be adjusted upon the threaded rod 167. It will be noted that the portion of this socket which is threaded upon the rod 167 is split and provided with a set screw by which it may be clamped in adjusted position. To permit the adjustment of the spring to be effected more easily, an anti-friction bearing is provided for the spring in the bottom of the socket 166. This anti-friction bearing comprises, as illustrated, a washer 252 in the bottom of the socket and a washer 254 upon which the spring 164 rests, anti-friction balls 256 being provided between the two washers.

In Figs. 20 and 21 is shown in detail an improved raceway having provision for quickly removing the nails from the raceway when it is desired to use a different kind of nail. The raceway is provided with a groove which is narrow at the top so that the head of the nail may rest upon the sides of the groove, but is large enough below the top so that when a portion of one of the sides of the groove is moved away from the other side the nail may drop through the bottom of the raceway. In the illustrated construction the side of the groove is provided near the lower end of the raceway with a slot 392 into which fits the upper end of a lever 394 pivoted at 396 between ears 398 formed upon the side of the raceway, said lever carrying at its lower end a set screw 400 which may be turned up against the side of the raceway to hold the upper end of the lever in position in the slot 392. The upper end of the lever 394 is so shaped that when in position in the slot 392 it makes the side of the raceway in which the slot is formed continuous. When it is desired to remove the nails from the raceway the set screw 400 is turned so that the lower end of the lever may be pushed up against the side of the raceway, thereby moving the upper end away from the oppo-
site side and permitting the heads of the
nails to drop through the enlarged upper
part of the groove. The inclined bottom of
the slot 392 of the raceway serves as a stop
for the upper end of the lever 394 when it
moves into position in the slot. The fore-
going arrangement for clearing the raceway
may conveniently be designated as a trap.
This invention will be made the subject mat-
ter of a divisional application.

In Fig. 13 is shown in detail an improved
edge gage having provision for adjustment
in two directions at right angles to each
other, whereby it may be maintained in
proper relation to the awl for different
lengths of work feed. The gage member
402 against which the edge of the work
bears is formed upon a slide 404 held against
the under side of the work abutment 266 by
bolts 406 passing through slots 408 in the
slide and supporting a plate 410 upon which
the slide 404 is movably carried. The slide
404 is provided with rack teeth 412 with
which mesh the teeth of an adjusting pinion
414 by which the slide may be moved trans-
versely to the work, said pinion being pro-
vided with an operating handle 415. Car-
ried in bearings in the slide 404 and extend-
ing longitudinally thereof is a shaft 416 hav-
ing formed upon it two pinions 417 which
engage rack teeth 418 upon the under side
of the work abutment 266, said shaft being
provided with an operating handle 419. By
turning the shaft 416, the slide 404 and with
it the gage 402 may be moved in a direction
parallel to the work feed and therefore when
the awl operating mechanism is adjusted to
give a different length of work feed, thereby
varying the initial position of the awl, the
gage 402 may be adjusted to position it di-
rectly behind the awl. This adjustment in-
sures a proper feeding of the work and a
proper gaging of the fastenings, since it is
important that the work be pressed up
against the gage at the time the awl forms
the fastening receiving opening in it and
that this gage be so positioned with respect
to the awl that the awl does not tend either
to turn the work during the feeding opera-
tion or to become cramped owing to the fact
that it is feeding the work in a direction
somewhat opposed to that in which it is
pressed.

The operation of the machine is as fol-
lows: The parts being in the position shown
in Fig. 1 at which time the awl depth con-
trolling mechanism is in neutral position
so that the awl will not be moved down with
the horn and the toggle 168, 170 is straight-
ened so that the spring 164 tends normally
to push the horn up against the work abut-
ment 266, the pawls 194 being held out of
engagement with the ratchet plate 186, by the finger 192 of the toggle link 168, the
operator depresses the treadle 12 to lower
the horn to permit the work to be placed
thereon, this depression of the treadle serv-
ing to compress the spring 164. When the
operator again releases the treadle, the work
will be pressed into engagement with the
work abutment and the slide 162 which is
moved downwardly by the spring 164 as the
horn is moved up into work clamping posi-
tion assumes a position determined by the
thickness of the work and through its con-
nections with the awl depth controlling
mechanism moves the fulcrum pin 184 into
such position that during the succeeding
operation of the awl operating mechanism
the awl will be forced into the work to a
depth proportioned to the thickness of the
work. The work having thus been placed
upon the horn, the operator removes his foot
from the treadle 12 and depresses the start-
ing treadle 14. This treadle is connected
by the rod 260 to the clutch actuating mech-
anism hereinabove described, and as the rod
260 is raised by the depression of the treadle
14 it operates to move the catch 367 out of
engagement with the catch 368, thereby per-
mitting the spring 352 to move the friction
member 348 into clutching engagement with
the constantly rotating loose pulley 18.
As the shaft 20 begins to rotate after the
pulley 18 has been clutched to it in the man-
ner just described, the awl is moved down-
wardly by its operating mechanism to form
a nail receiving opening in the work, the
work being pushed up against the gage 402
which is located directly back of it and at
the same time the driver is moved upwardly
until it clears the throat 62. As the awl
completes its work penetrating movement,
the horn is depressed by the breaking of the
toggle 168, 170, the slide 162 being at this
time locked to the ratchet plate 186 so that
the spring 164 cannot react upon the horn dur-
ing the horn release and so that the awl
depth controlling mechanism will have no
effect upon the position of the awl. The
awl then feeds the work over the horn until
the fastening receiving opening which it has
formed in the work is brought beneath the
driver passage, the throat and separator be-
ing withdrawn simultaneously during the
work feeding movement, whereby the throat
is moved out of the path of the awl. As the
awl returns to its initial position after the
work feeding operation, the throat and sep-
arator are moved back into their original po-
sitions, the separator acts to deliver a nail to
the throat as the fastening receiving open-
ing in the throat comes beneath the driver
passage, and the driver completes its upward
movement. The peculiar timing of the
movements of the throat and separator and
driver at this time constitutes a very important feature of the invention, since it insures a substantially positive and uniform delivery of nails to the throat at all speeds of operation. This timing is shown especially in Figs. 7 to 11 inclusive, the separator blade employed in this construction being shown in perspective in Fig. 12.

In Fig. 7 the parts are shown in the position which they assume when the machine stops, the separator 80 being at this time located between the driver and the endmost nail in the raceway, the driver being down and the awl being up. In Fig. 8 are shown the first movements of these parts as the shaft 20 begins to rotate, the driver being raised to clear the throat and the awl being moved down to cause it to penetrate the work. As the awl feeds the work, the throat and separator are withdrawn as shown in Fig. 9, but there is a dwell in the upward movement of the driver after it has cleared the throat so that the driver blocks the end of the raceway and prevents any part of the endmost nail from entering the driver passage. As the awl is withdrawn from the work and returns to its initial position, the driver is moved upwardly until its lower end is opposite the head of the endmost nail, at which time a second dwell is provided in the upward movement of the driver, the separator now coming forward between the last two nails in the line in the raceway, the thin entrant portion 420 of the blade, this portion being of substantially uniform thickness from bottom to top, entering first between the shanks of the two nails and then an intermediate portion 422 which is wedge-shaped, that is, thicker at the bottom than at the top, following the entrant portion and tipping the shank of the nail into the driver passage while the head of the nail is still retained in the raceway by the lower end of the driver. As the shank of the nail is tipped into the raceway by the part 422 of the separator, the solid lower part 424 of the separator covers the driver passage in the lower part of the driver guide 60 and traps the shank of the nail in said passage, thus preventing the shank from moving back into the raceway. At this time a dwell is preferably provided in the movement of the separator and throat during which the driver moves upwardly and releases the head of the nail. As the head of the nail is released by the driver, the separator again moves forward and the part 426 of the blade pushes the upper part of the nail into the driver passage just before the driver descends to drive it, the nail resting upon a lip 428 of the throat 62 in the event that it drops down through the driver passage in the guide 60 before the opening 430 in the throat comes into line therewith. The part 426 of the separator blade is of substantially uniform thickness from bottom to top. The driver having descended to drive the nail into the work, the cycle of operations for the insertion of a single nail is completed.

If the operator maintains his foot upon the treadle 14, two or more nails will be driven in rapid succession, depending upon the length of time the treadle is left depressed. When the treadle is released, the cam 376 will operate through the connections hereinabove described to move the friction member 348 out of clutching engagement with the loose pulley 332, the catch 367 having been moved into operative relation to the catch 368 by the action of spring 262 upon the clutch actuating rod 260, and said friction member will be moved into engagement with the machine head at such time that the shaft 20 will be stopped with the parts in the position shown in Fig. 1.

Having described my invention, what I claim as new and desire to secure by Letters Patent of the United States is:—

1. A machine of the class described having, in combination, fastening inserting mechanism, an awl, means for operating said awl to cause it to form a fastening receiving opening in the work and then to feed the work, a movable fastening receiving throat normally located within the path of the work feeding movement of said awl, means for moving said throat transversely to said path to place it out of the way of the awl during its work feeding movement, and means associated with said throat and its moving means for delivering a fastening to said throat.

2. A machine of the class described having, in combination, fastening inserting mechanism, an awl and a fastening receiving throat, means for moving said awl to feed the work and to bring the awl hole into position to receive a fastening inserted by said inserting mechanism, means for moving said throat transversely of the path of movement of the awl to place it out of the way of the awl during the work feeding movement of the latter, and means for delivering a fastening to said throat upon its return into the path of said awl.

3. In a machine of the class described, the combination with fastening inserting mechanism and an awl arranged to feed the work to bring the awl hole into position to receive a fastening inserted by said inserting mechanism, of a fastening-receiving throat normally located within the path of the work feeding movement of the awl and movable transversely of said path to place it out of the way of the awl during the work feeding movement of the latter, and means to deliver a fastening to the fastening receiving throat when in its normal position.

4. In a machine of the class described, the combination with fastening inserting mechanism and an awl arranged to feed the work to bring the awl hole into position to receive a fastening inserted by said inserting mechanism, of a fastening raceway in substantial alinement with the work feeding path of the awl, and a fastening-receiving throat located when in operative position in the work feeding path of said awl, and movable transversely of said path to place it out of the way of said awl during the work feeding movement of the latter.

5. In a machine of the class described, the combination with fastening inserting mechanism and an awl arranged to feed the work to bring the awl hole into position to receive a fastening inserted by said inserting mechanism, of a stationary fastening raceway arranged to deliver fastenings at a point within the plane of the feed movement of said awl, a fastening-receiving throat normally in coöperative relation to said raceway, means for moving said throat transversely to the path of feed movement of said awl out of the way of the latter and means for delivering a fastening from said raceway to said throat.

6. In a machine of the class described, the combination with a stationary part provided with a driver passage, a raceway arranged to deliver a fastening to said driver passage, and work feeding means comprising an awl arranged to bring an awl hole in the work beneath the driver passage, of a separator, a fastening-receiving throat, and means for moving said separator and said throat transversely to said raceway and also transversely to the path of movement of said awl.

7. In a machine of the class described, the combination with a driver, a raceway and an awl, of a movable throat having a fastening-receiving opening, means for bringing said awl and the fastening-receiving opening of said throat alternately beneath the driver in directions at right angles to each other, and means for delivering a fastening from said raceway to said fastening-receiving opening of said throat as said throat comes into position beneath the driver.

8. In a machine of the class described, the combination with a driver, a raceway and an awl, of a movable throat having a fastening-receiving opening, means for bringing said awl and the fastening-receiving opening of said throat alternately beneath the driver, and means for delivering a fastening from said raceway to said fastening-receiving opening of said throat as said throat comes into position beneath the driver.

9. In a machine of the class described, an awl, a fastening receiving throat and a driver movable in succession to the same point in directions extending along three dimensions, means for positively controlling the timing of the movements of said parts, and means for delivering a fastening to said throat between the arrival of said throat at said point and the descent of the driver to drive the fastening at said point.

10. In a machine of the class described, the combination with an awl and a fastening receiving throat movable alternately to the same point in directions substantially normal to each other, of means for controlling positively the movements of said awl and said throat, means for delivering a fastening to said throat, and means to drive said fastening into the awl hole while the throat is located at said point.

11. In a machine of the class described, an awl and a fastening receiving throat movable alternately to the same point in directions substantially normal to each other, said awl being also movable in a direction substantially normal to its first mentioned movement to form an awl hole in the work, means for controlling positively both the movements of the awl and the movements of the throat, means for automatically varying the amount of penetration of the awl into the work in accordance with variations in the thickness of the work, means for driving a fastening into the awl hole while the throat is located above said awl hole, and means for positively controlling the timing of the fastening driving means with respect to the movements of the awl and the throat.

12. In a machine of the class described, a vertically reciprocating driver, an awl and a fastening receiving throat movable alternately to a point beneath said driver in directions substantially normal to each other, means for positively controlling the timing of said parts, and yielding means for delivering a fastening to said throat before the descent of said driver.

13. In a machine of the class described, an awl and a fastening receiving throat movable alternately to the same point in directions substantially normal to each other, a fastening raceway having its lower end adjacent to said point, and a fastening separator movable with one of the aforementioned movable parts into and out of operative relation to said raceway.

14. In a machine of the class described, the combination with a stationary raceway and a fastening receiving throat movable transversely to said raceway, of an awl, means for causing said awl to bring an awl hole into alinement with the opening in said throat when said throat is in operative position, a fastening separator yieldingly connected with said throat, and means for moving said throat and separator simultaneously both out of and into operative position whereby a fastening is guided by said throat into said awl hole.

15. In a machine of the class described, the combination with a driver and an awl adapted to feed the work, of a fastening raceway in substantial alinement with the work feeding path of the awl, a fastening separator and a fastening receiving throat, both movable transversely to the work feeding path of said awl, and a single actuating means for said separator and said throat.

16. In a machine of the class described, the combination with a fastening raceway, a fastening driver and a fastening receiving throat, of a slide upon which said throat is mounted, means for moving said slide transversely to the fastening raceway to bring said throat into and out of operative position with respect to the fastening driver, a fastening separator mounted upon said slide with provision for adjustment transversely thereto, and means for maintaining said separator yieldingly in a predetermined relation to said throat.

17. In a machine of the class described, the combination with a fastening raceway, a fastening driver and a fastening-receiving throat, of a slide upon which said throat is mounted, means for moving said slide transversely of the fastening raceway to bring said throat into and out of operative position with respect to the fastening driver, a fastening separator mounted upon said slide with provision for adjustment transversely thereof, and means for maintaining said separator yieldingly in a predetermined relation to said throat.

18. In a machine of the class described, a driver, a fastening receiving throat and an awl movable alternately to a point beneath the driver in directions at substantially right angles to each other, a raceway in the line of movement of said awl, means for controlling positively the movements of said awl and said throat, a separator movable with said throat into coöperative relation to said raceway, and yielding connections between said separator and said throat wherby misplaced fastenings will not interfere with the timing of the movements of the positively controlled parts.

19. A machine of the class described having, in combination, a raceway, a driver guide provided with a driver passage into which said raceway opens, a driver and a movable fastening-receiving throat, and means for imparting to said driver a stepwise upward movement.

20. In a machine of the class described, the combination with a fastening raceway and a movable fastening-receiving throat, of a driver and means for actuating said driver in such manner that in its upward movement there is a dwell after it clears the throat during which it retains the fastenings in the raceway.

21. In a machine of the class described, the combination with a fastening raceway and a movable fastening-receiving throat, of a driver, a driver cam constructed and arranged to operate said driver in such manner that in its upward movement there is a dwell after it clears the throat during which it retains the fastenings in the raceway, and means for moving the throat out of and into fastening receiving position in timed relation to the before mentioned operation of the driver.

22. In a machine of the class described, the combination with a fastening-raceway, a fastening separator and a movable fastening-receiving throat, of a fastening driver and driver operating means constructed and arranged to operate said driver in such manner that it retains the fastenings in the raceway while the fastening separator and the fastening throat are out of their operative positions.

23. In a machine of the class described, the combination with a fastening raceway and a driver adapted to hold the fastenings in the raceway during the feeding of the work, of a fastening separator, a fastening throat and means to move the throat into a position to receive, and the separator into a position to separate from the others, the endmost fastening in the raceway as the driver rises to release said fastening.

24. In a machine of the class described having, in combination, a raceway, a driver guide provided with a driver passage, a driver, and a separator constructed to move the shank of the fastening into the driver passage in advance of the head, and means for actuating said driver and said separator in such time relation to each other that the separator traps in the driver passage the shank of the endmost fastening in the raceway while the driver retains the head of said fastening in the raceway and outside of the driver passage.

25. A machine of the class described having, in combination, a raceway, a driver guide provided with a driver passage into which said raceway opens, a driver and separator constructed to move the shank of the fastening into the driver passage in advance of the head, means for operating said driver and said separator constructed and arranged to operate therein in such time relation to each other that the separator traps in the driver passage the shank of the endmost fastening in the raceway while the driver retains the head of said fastening in the raceway and that then there is a dwell in the movement of the separator while the driver rises to release the head of said fastening.

26. A machine of the class described having, in combination, a raceway, a driver guide provided with a driver passage, a driver and a separator constructed to move the shank of the fastening into the driver passage in advance of the head, means for actuating said driver and said separator, constructed and arranged to operate them in such time relation to each other that the driver blocks the end of the raceway during the withdrawal of the separator out of operative relation thereto, and that then the separator moves forward and tips the shank of the fastening to be separated into the driver passage while the driver retains the head of said fastening in the raceway and outside of the driver passage.

27. A machine of the class described having, in combination a raceway, a movable fastening-receiving throat, a driver and a driver operating cam constructed and arranged to operate said driver in such manner that in its upward movement there is a dwell after it clears the throat during which it blocks the raceway, a separator, and means for operating said separator, the movements of said separator and said driver being so timed that the separator serves to strip the shank of the endmost fastening in the driver passage during a second dwell of said driver in the region of the head of the fastening.

28. A machine of the class described having, in combination, a raceway, a separator and a driver, means for operating said separator and means for actuating said driver, said two means coöperating in such manner that the driver has imparted to it a three step upward movement and that between the first and second steps there is a dwell during which it retains the fastenings in the raceway, that between the second and third steps there is a dwell during which it coöperates with the separator to trap the shank of the fastening in the driver passage while its head is retained in the raceway and that during the last step the completion of the delivery of the fastening from the raceway is effected.

29. A machine of the class described having, in combination, a fastening raceway, a separator and a driver, means for actuating said separator and said driver in such time relation to each other that in the upward movement of the driver there is a dwell during which it blocks the raceway while the separator is withdrawn, to permit the endmost fastening to contact with the driver and that then there is a second dwell in the upward movement of the driver with the lower end of the driver in engagement with the head of the fastening during which the separator moves the shank of the fastening into the driver passage and traps it therein and that the completion of the upward movement of the driver and the completion of the delivery of the fastening to the driver passage by the separator are effected simultaneously.

30. A fastening separator having the thin entrant portion of its separating blade of substantially uniform thickness from the bottom to top, and having behind said entrant portion of the blade a portion of greater thickness at the bottom than at the top, and having behind said intermediate portion of the blade another portion thicker than either of the first mentioned portions and of substantially uniform thickness from bottom to top.

31. A machine of the class described having, in combination a raceway, a driver guide provided with a driver passage, a driver, and a separator, said separator comprising a separating blade having three operative portions arranged to operate in succession, the first of said portions serving to separate the endmost two fastenings in the raceway and being thin and of substantially uniform thickness from bottom to top, the second of said portions serving to tip the shank of the fastening into the driver passage while the head of said fastening is retained in the raceway by the driver and being thicker at the bottom than at the top, and the third of said portions serving to effect the delivery of the fastening to the driver passage and being of substantially uniform thickness from bottom to top, and means for operating the separator and driver to effect the just described separating operation.

32. In a machine of the class described, the combination with a fastening raceway, and a driver and means for operating said driver whereby it is adapted to hold the fastenings in the raceway during the feeding of the work, of a fastening separator, a fastening throat and means to move the throat into a position to receive, and the separator into a position to separate from the others, the endmost fastening in the raceway as the driver rises to release said fastening.

33. In a machine of the class described, the combination with a fastening raceway, a driver, a fastening separator and a movable fastening-receiving throat, of means for actuating said separator and means for actuating said driver, said means being constructed and arranged to raise the driver to permit movement of the fastening-receiving throat, to stop the driver in fastening-retaining position with respect to said raceway and to complete the raising of the driver after the point of the fastening separator has come between the last two fastenings in the raceway.

34. In a machine of the class described, the combination with a driver and means for operating said driver, a fastening raceway, a throat having a fastening-receiving opening, and a fastening separator, of means for moving said throat and said separator transversely to said raceway, said driver operating to maintain the endmost fastening in the raceway while the separator is withdrawn and until it enters behind said fastening, and means for sustaining the separated fastening until the fastening-receiving opening of the throat comes beneath the driver.

35. In a machine of the class described, the combination with a fastening raceway and a driver and means for operating said driver whereby it is adapted to hold the fastenings in the raceway during the work feeding operation, of a throat having a fastening-receiving opening and a fastening separator, both movable transversely of the raceway and a lip on the throat for supporting the endmost fastening in the raceway, as the separator moves forward to separate it from the others, after the driver has released it and before the fastening-receiving opening in said throat comes beneath it.

36. In a machine of the class described, the combination with a fastening raceway, a driver adapted to hold the fastenings in the raceway during the feeding of the work, and a fastening-receiving throat, of means for effecting through said parts a fastening-inserting cycle of operations comprising raising the driver to release the endmost fastening in the raceway, movement of the separator into position to separate said fastening from the others, simultaneous movement of the throat into position to receive said fastening as it is forced out of the raceway and descent of the driver to drive the fastening.

37. A machine of the class described having, in combination, means for inserting fastenings, means for feeding the work between successive inserting operations comprising an awl mounted to have a straight line movement in the work feeding direction, and means for moving said awl to cause it to feed the work comprising a floating lever having an adjustable stationary fulcrum.

38. A machine of the class described having, in combination, means for inserting fastenings, means for feeding the work between successive inserting operations comprising an awl, a slide upon which said awl is mounted to move in a direction transverse to its work penetrating movement, means for positively reciprocating said slide comprising a floating lever, a stationary fulcrum for said lever, a support on which said fulcrum is adjustably mounted, said lever being provided with a guideway and a fulcrum block pivoted upon said fulcrum and mounted to slide in said guideway.

39. In a machine of the class described, a double raceway, a reciprocating carrier, raceway shifting mechanism comprising a part connected with the raceway and another part mounted upon said carrier and arranged to coöperate with said first mentioned part as said carrier approaches one end of its reciprocating movement, and means controlled by the thickness of the work arranged to engage the part of the shifting mechanism which is mounted upon the carrier, as said carrier approaches the other end of its reciprocating movement, to set said part so that the raceway will be shifted into position to supply the fastening required by the work thickness to be operated upon.

40. In a machine of the class described, a double raceway, a reciprocating carrier, raceway shifting mechanism comprising a slide connected to the raceway and a double pawl mounted upon said carrier and arranged to coöperate with said slide to shift said raceway in one direction or the other in accordance with the position of said pawl upon said carrier, and a pawl tipper controlled by the thickness of the work and located at that end of the reciprocating movement of said carrier remote from that at which it coöperates with the slide.

41. In a machine of the class described, a double raceway, raceway shifting mechanism comprising a double pawl, means located at a point remote from said raceway shifting mechanism for setting said pawl in different operative positions in accordance with changes in the thickness of the work, and means upon which said pawl is pivoted and by which it is carried from a position in which it coöperates with said setting means into a position in which it coöperates with the other parts of said shifting mechanism to shift the raceway in the desired direction.

42. A machine of the class described having, in combination, mechanism for inserting fastenings, a raceway and a rotating hopper, a driving shaft from which said inserting mechanism is driven and a normally rotating pulley through which movement is imparted to said shaft and independently to said hopper, means for effecting and for breaking the operative connections between said shaft and said pulley, and independent means arranged to be controlled from a point adjacent to said inserting mechanism for effecting and for breaking the operative connections between said hopper and said pulley.

43. A machine of the class described having, in combination mechanism for inserting fastenings, an awl for forming a fastening receiving opening in the work and feeding said work into operative position beneath the inserting mechanism, and a work gage located behind the work penetrating position of said awl, mechanism for operating the awl, means for adjusting the awl operating mechanism to vary the work penetrating position of the awl and the amount of its work feeding movement, and means for adjusting the gage to maintain its relation to the awl.

44. A machine of the class described having, in combination, a driver and an awl spaced apart a distance equal to the desired distance between successive fastenings to be inserted, means for actuating said awl to feed the work, said awl and said means being adjustable to effect a variation in the spacings of the fastenings, a gage for engaging the edge of the work in a predetermined relation to said awl, and means for effecting an adjustment of said gage to maintain its relation to the awl when the awl is adjusted to vary the spacing of the fastenings.

45. A machine of the class described having, in combination, an awl, means for moving said awl to feed the work, a fastening receiving throat normally located within the path of the work feeding movement of said awl and movable transversely to said path to place it out of the way of the awl during its work feeding movement, a driver and means for imparting to said driver a quick upward movement to clear the throat in advance of the work feeding movement of said awl.

46. A machine of the class described having, in combination, a raceway, a driver guide provided with a driver passage into which said raceway opens, a driver and a movable fastening receiving throat, and means for imparting to said driver a stepwise upward movement, the first step of said upward movement being relatively quick in order to clear said throat.

In testimony whereof I have signed my name to this specification in the presence of two subscribing witnesses.

GEORGE GODDU.

Witnesses:
H. DORSEY SPENCER,
FREDERICK L. EDMANDS.

means for adjusting the gage to maintain its relation to the awl.

44. A machine of the class described having, in combination, a driver and an awl spaced apart a distance equal to the desired distance between successive fastenings to be inserted, means for actuating said awl to feed the work, said awl and said means being adjustable to effect a variation in the spacings of the fastenings, a gage for engaging the edge of the work in a predetermined relation to said awl, and means for effecting an adjustment of said gage to maintain its relation to the awl when the awl is adjusted to vary the spacing of the fastenings.

45. A machine of the class described having, in combination, an awl, means for moving said awl to feed the work, a fastening receiving throat normally located within the path of the work feeding movement of said awl and movable transversely to said path to place it out of the way of the awl during its work feeding movement, a driver and means for imparting to said driver a quick upward movement to clear the throat in advance of the work feeding movement of said awl.

46. A machine of the class described having, in combination, a raceway, a driver guide provided with a driver passage into which said raceway opens, a driver and a movable fastening receiving throat, and means for imparting to said driver a stepwise upward movement, the first step of said upward movement being relatively quick in order to clear said throat.

In testimony whereof I have signed my name to this specification in the presence of two subscribing witnesses.

GEORGE GODDU.

Witnesses:
H. DORSEY SPENCER,
FREDERICK L. EDMANDS.

---

Correction in Letters Patent No. 1,030,775.

It is hereby certified that in Letters Patent No. 1,030,775, granted June 25, 1912, upon the application of George Goddu, of Winchester, Massachusetts, for an improvement in "Machines for Inserting Fastenings," an error appears in the printed specification requiring correction as follows: Page 13, line 117, for the word "therein" read *them;* and that the said Letters Patent should be read with this correction therein that the same may conform to the record of the case in the Patent Office.

Signed and sealed this 1st day of October, A. D., 1912.

[SEAL.]

C. C. BILLINGS,
*Acting Commissioner of Patents.*

It is hereby certified that in Letters Patent No. 1,030,775, granted June 25, 1912, upon the application of George Goddu, of Winchester, Massachusetts, for an improvement in "Machines for Inserting Fastenings," an error appears in the printed specification requiring correction as follows: Page 13, line 117, for the word "therein" read *them;* and that the said Letters Patent should be read with this correction therein that the same may conform to the record of the case in the Patent Office.

Signed and sealed this 1st day of October, A. D., 1912.

[SEAL.]

C. C. BILLINGS,

*Acting Commissioner of Patents.*